2,881,084

STABILIZED TALL OIL ROSIN SIZE COMPOSITIONS AND METHODS OF PREPARATION

Spencer H. Watkins, Wilmington, Del., assignor to Hercules Powder Company, Wilmington, Del., a corporation of Delaware No Drawing. Application September 14, 1956
Serial No. 609,823

4 Claims. (Cl. 106—123)

This invention relates to tall oil rosin sizes stabilized against crystallization and to methods of preparing same.

Tall oil contains approximately 90% acidic material when separated into its two main fractions, the resin resin acids. In the alkaline pulping processes, the acids are solubilized in the liquor, floated to the top and skimmed off the spent cooking liquor. This material, referred to as soap skimmings or crude sulfate soap, is then cooked with mineral acid to obtain crude tall oil in yields of 70–90 lb./ton of pulp.

Tall oil can be used more effectively and profitably when separated into the two main fractions, the resin acids and the fatty acids. Many processes for effecting the separation have been reported, by using the differences in both chemical and physical properties of the two classes of acids. One of the more effective means is fractional distillation of crude tall oil at reduced pressure to obtain resin and fatty acids fractions, one being contaminated with as little as 3% or less of the other. Other methods involve: (1) the fractional esterification of the fatty acids with polyhydric alcohols followed by the distillation of the resin acids, (2) total esterification of the tall oil followed by fractional saponification of the fatty acid esters followed by extraction, and (3) fractional precipitation of the resin acids out of acetone solution of the tall oil followed by decomposition of the resin acid salts with mineral acid.

Commercially available tall oil rosin is competive with gum or wood rosin in many respects. However, rosin sizes prepared from tall oil rosin exhibit a much greater tendency to crystallize than do sizes similarly prepared from gum or wood rosin. As a result, some treatments which have been satifactorily used for stabilizing gum and wood rosin sizes against crystallization have not worked out satisfactorily for stabilizing sizes prepared from tall oil rosin.

A principal object of the present invention is the provision of an improved method for preventing crystallization of tall oil rosin sizes.

A further object of the invention is the provision of paste tall oil rosin size compositions having improved stability against crystallization and a method of making same.

It has now been discovered that crystallization is strikingly inhibited in paste tall oil rosin sizes by the inclusion therein of from about 5% to about 20% by weight, based on the weight of rosin, of a rosin acid ester of a polyhydric alcohol selected from the group consisting of ethylene glycol, pentaerythritol and sorbitol. Tall oil rosin sizes so treated are resistant to crystallization over relatively long periods of time even when seeded with rosin salt crystals.

Having described the invention generally, the following examples are presented in illustration but not in limitation of the invention. All parts and percentages are by weight unless otherwise specified.

EXAMPLES 1–12

Paste sizes were prepared from tall oil rosin alone and tall oil rosin containing varying amounts of the rosin esters of ethylene glycol and pentaerythritol furnished in the form of Flexalyn C and Pentalyn A. The sizes were cooked in the usual manner by melting the rosin, adding sufficient water and caustic to give the desired total solids and free rosin and stirring until a smooth paste was obtained. Samples of each size were seeded with rosin size crystals and stored in an oven, in a closed container, at 60° C. The rate of crystallization was determined by examining the samples microscopically at 3–4 day intervals. The results of these tests are shown in the following table:

Table I

| Ex. No. | Crystallization inhibitor | Percent inhibitor | Percent free rosin | Crystallization |
|---|---|---|---|---|
| 1 | None | | 10 | Crystd. in 15 days. |
| 2 | Flexalyn C | 5.0 | 10 | Crystd. in 20 days. |
| 3 | do | 10.0 | 10 | Moderately crystd. in 48 days. |
| 4 | do | 15.0 | 10 | No crystal growth in 48 days. |
| 5 | Pentalyn A | 5.0 | 10 | No crystal growth in 43 days. |
| 6 | do | 10.0 | 10 | Do. |
| 7 | None | | 15 | Crystd. in 9 days. |
| 8 | Flexalyn C | 5.0 | 15 | Crystd. in 32 days. |
| 9 | do | 10.0 | 15 | Moderately crystd. in 43 days. |
| 10 | do | 15.0 | 15 | Slightly crystd. in 43 days. |
| 11 | Pentalyn A | 5.0 | 15 | Crystd. in 29 days. |
| 12 | do | 10.0 | 15 | Moderately crystd. in 43 days. |

It will be apparent from Examples 1–12 that tall oil rosin size compositions containing from about 5% to about 15% of a rosin acid ester of ethylene glycol or pentaerythritol have substantially improved resistance to crystallization. Moreover, it has been found that this improvement in crystallization tendencies is obtainable without sacrifice of sizing efficiency. This will be apparent from the following examples.

EXAMPLES 13–15

Paste rosin sizes were prepared from tall oil rosin alone and from tall oil rosin containing varying amounts of crystallization inhibitor following the procedure of Examples 1–12. The sizes so prepared were utilized in sizing paper in accordance with the following procedure.

Weyerhaeuser bleached sulfite pulp was beaten to a Schopper-Reigler freeness of 750±10 cc. To the slush pulp was added the required amount (1% or 2%, based on the weight of the dry pulp) of the above described tall oil rosin size in the form of an aqueous dispersion containing 3% rosin size solids. The rosin size was precipitated on the pulp fibers by the addition to the slush stock of 2.5% of papermaker's alum. The stock was further diluted to 0.025% consistency and sheets of paper were then prepared on a Noble and Wood handsheet machine, pressed and dried.

The sized papers, prepared as described, were then tested for ink resistance utilizing a Hercules Photometer. The results are set forth in the table below:

Table II

| Ex. No. | Crystallization inhibitor | Percent inhibitor | Ink resistance (SEC) Hercules photometer 85% reflectance | |
|---|---|---|---|---|
| | | | 1.0% size | 2.0% size |
| 13 | None | | 65 | 152 |
| 14 | Flexalyn C | 10 | 62 | 157 |
| 15 | do | 15 | 70 | 147 |

The crystallization inhibitors utilized in the examples are commercial products of the Hercules Power Company having the following characteristic properties:

Ultraviolet:
Total abietic-type acid (percent) _____ 45–55
Dehydroabietic acid (percent) _____ 15–20
Color (USDA Rosin Color Scale) _____ N–WG
Specific rotation _____ −5.0 to +5.0

*Table III*

| Crystallization inhibitor | Description | Acid number | Color, U.S.D.A. rosin scale | Softening point, Hercules drop method, °C. | Bulking value, lb./gal. at 25°C. | Gardner-Holdt viscosity and Gardner color | | | |
|---|---|---|---|---|---|---|---|---|---|
| | | | | | | Test solution | | Viscosity at 25°C. | Color |
| | | | | | | Percent resin solids | Solvent | | |
| Flexalyn C | Ethylene glycol ester of rosin. | 15 max | N max | 55–65 | 8.8 | | | | |
| Pentalyn A | Pentaerythritol ester of rosin. | 16 max | M max | 109–116 | 8.9 | 60 | Mineral spirits. | E–H | 11 max |

The rosin acid esters of the polyhydric alcohols contemplated for use herein may be prepared by reacting rosin with the polyhydric alcohol in accordance with conventional and well-known procedures. For example, the reaction may be carried out at temperatures from about 200° C. to 300° C. for a period of time from about 45 minutes to about 2 hours in the presence of a suitable catalyst such as zinc, zinc salts, boric acid and so on. Any suitable rosin material may be utilized in the reaction including ordinary gum, wood or tall oil rosins, especially refined and/or purified rosins, hydrogenated rosins and disproportionated rosins. The polyhydric alcohols which may be used are ethylene glycol, pentaerythritol and sorbitol.

The amount of rosin acid ester required to secure effective stabilization against crystallization in paste tall oil rosin sizes containing at least about 10% free rosin, which is about the lower practical limit for free rosin in commercially utilizable rosin sizes, is from about 5% to about 20% by weight, based on the weight of the rosin. Amounts below about 5% do not give the required stability while amounts above about 20% add very little, if anything, to the stability attained, and, in addition, cause a decrease in sizing efficiency. In most cases, the amount of rosin acid ester required will vary from about 10% to about 15%, and this range is preferred.

In the preparation of the tall oil rosin size compositions in accordance with the invention, the rosin acid ester may be added to the tall oil rosin and the tall oil rosin then converted into size, in the usual manner, as by heating with an alkali such as sodium carbonate, sodium hydroxide and so on. Alternatively, the rosin acid ester may be added during or after preparation of the size or prepared in situ by reacting the tall oil rosin with the proper amount of the polyhydric alcohol under suitable reaction conditions.

The process of the invention is applicable to the stabilization of rosin size compositions prepared from tall oil rosin. While tall oil rosin varies somewhat depending on its derivation and method of recovery and purification, the following are typical properties of such a product prepared by fractional distillation at reduced pressures:

Acid number _____ 168–172
Saponification number _____ 172–178
Softening point (ring and ball) _____ 78–85° C.
Resin acids (percent) _____ 89.0–91.0
Fatty acids (percent) _____ 1–3

The process of the invention is also applicable to the preparation of tall oil rosin size compositions containing adducts of rosin and materials such as maleic acid, maleic anhydride, fumaric acid, itaconic acid, citraconic acid and the like, and known in the art as fortified rosin sizes. As before, the rosin acid ester may be added at any desired point before, during or after size formation and before, during or after addition and/or formation of the adduct.

It will thus be seen that the process of the invention permits the preparation of rosin sizes stabilized against crystallization in both the paste and dilute emulsion (3% total solids) forms even when seeded and held in storage at 60° C. While preferred embodiments of the invention have been described herein, the invention is not to be construed as limited thereby except as the same may be included in the following claims.

What I claim and desire to protect by Letters Patent is:

1. A tall oil rosin size composition containing, as a crystallization inhibitor, from about 5% to about 20% by weight, based on the weight of tall oil rosin, of an ester of a rosin acid and a polyhydric alcohol selected from the group consisting of ethylene glycol, pentaerythritol and sorbitol.

2. A paste tall oil rosin size composition containing, as a crystallization inhibitor, from about 5% to about 20% by weight, based on the weight of rosin, of an ester of rosin and a polyhydric alcohol selected from the group consisting of ethylene glycol, pentaerythritol and sorbitol.

3. A paste tall oil rosin size composition in accordance with claim 2 in which the polyhydric alcohol is ethylene glycol.

4. A paste tall oil rosin size composition in accordance with claim 2 in which the polyhydric alcohol is pentaerythritol.

References Cited in the file of this patent

UNITED STATES PATENTS

| | | |
|---|---|---|
| 2,309,346 | Landes et al. | Jan. 26, 1943 |
| 2,325,172 | Borglin | July 27, 1943 |
| 2,440,242 | Auer | Apr. 27, 1948 |
| 2,503,772 | Rust | Apr. 11, 1950 |
| 2,584,300 | Simmers | Feb. 5, 1952 |
| 2,744,889 | Gayer | May 8, 1956 |
| 2,776,275 | Strazdins | Jan. 1, 1957 |
| 2,791,578 | Drechsel et al. | May 7, 1957 |

UNITED STATES PATENT OFFICE
CERTIFICATE OF CORRECTION

Patent No. 2,881,084                                    April 7, 1959

Spencer H. Watkins

It is hereby certified that error appears in the printed specification of the above numbered patent requiring correction and that the said Letters Patent should read as corrected below.

Column 1, line 18, strike out "when separated into its two main fractions, the resin" and insert instead -- which is composed of essentially equal parts of fatty and --; line 26, for "the", first occurrence, read -- its --; line 42, for "competive" read -- competitive --; column 3, line 2, for "Power" read -- Powder --.

Signed and sealed this 21st day of July 1959.

(SEAL)
Attest:

KARL H. AXLINE                                                 ROBERT C. WATSON

Attesting Officer                                            Commissioner of Patents